US008341429B2

United States Patent
Buckingham et al.

(10) Patent No.: US 8,341,429 B2
(45) Date of Patent: *Dec. 25, 2012

(54) DATA TRANSFER DEVICE

(75) Inventors: Jonathan Peter Buckingham, Bristol (GB); Liqun Chen, Bristol (GB); Christopher Williams, Devauden/Chepstow Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1123 days.

This patent is subject to a terminal disclaimer.

(21) Appl. No.: 12/239,806

(22) Filed: Sep. 28, 2008

(65) Prior Publication Data

US 2009/0208018 A1 Aug. 20, 2009

(30) Foreign Application Priority Data

Feb. 20, 2008 (GB) .................................. 0803052.0

(51) Int. Cl.
*H04L 9/28* (2006.01)
*G06F 11/30* (2006.01)
(52) U.S. Cl. .......................... 713/193; 380/281; 380/284
(58) Field of Classification Search .................. None
See application file for complete search history.

(56) References Cited

U.S. PATENT DOCUMENTS

| | | | | |
|---|---|---|---|---|
| 5,604,801 A * | 2/1997 | Dolan et al. | ................. | 713/159 |
| 5,774,544 A | 6/1998 | Lee et al. | | |
| 6,577,735 B1 * | 6/2003 | Bharat | ........................... | 380/286 |
| 7,010,808 B1 * | 3/2006 | Leung et al. | ................... | 726/26 |
| 7,051,213 B1 * | 5/2006 | Kobayashi et al. | .......... | 713/194 |
| 7,283,633 B2 * | 10/2007 | Asano et al. | .................. | 380/281 |
| 7,328,352 B2 * | 2/2008 | Fontijn et al. | ................. | 713/193 |
| 7,818,587 B2 * | 10/2010 | Drew et al. | .................... | 713/193 |
| 7,870,606 B2 * | 1/2011 | Peretti | ............................. | 726/21 |
| 7,962,763 B2 * | 6/2011 | Trezise et al. | ................. | 713/193 |
| 2001/0056541 A1 * | 12/2001 | Matsuzaki et al. | ............ | 713/193 |
| 2003/0074319 A1 | 4/2003 | Stierman et al. | | |
| 2004/0098348 A1 * | 5/2004 | Kawasaki et al. | ............... | 705/59 |
| 2004/0103288 A1 * | 5/2004 | Ziv et al. | ....................... | 713/185 |
| 2005/0013441 A1 * | 1/2005 | Klein | ........................... | 380/278 |
| 2005/0216763 A1 * | 9/2005 | Lee et al. | ...................... | 713/200 |
| 2005/0244001 A1 | 11/2005 | Kitani et al. | | |
| 2005/0268346 A1 * | 12/2005 | Lee et al. | ......................... | 726/27 |
| 2005/0283714 A1 * | 12/2005 | Korkishko et al. | ............ | 714/781 |
| 2006/0193470 A1 * | 8/2006 | Williams | ....................... | 380/259 |
| 2007/0005974 A1 * | 1/2007 | Kudou | .......................... | 713/171 |
| 2007/0180272 A1 | 8/2007 | Trezise et al. | | |
| 2008/0063209 A1 | 3/2008 | Jaquette et al. | | |

FOREIGN PATENT DOCUMENTS

EP 1020856 7/2000

(Continued)

OTHER PUBLICATIONS

UK Intellectual Property Office, Combined Search and Examination Report for GB0803052.0 dated Jun. 13, 2008 (7 pages).

*Primary Examiner* — Christopher Revak (57) ABSTRACT

A data transfer device for transferring data to a removable data storage item. The data transfer device receives content data to be stored to the removable data storage item, encrypts the content data using an encryption key, and transforms at least one of predetermined reference data and the encryption key. The data transfer device also encrypts the transformed predetermined reference data using the encryption key or encrypts the predetermined reference data using the transformed encryption key, and then stores the encrypted content data and the encrypted transformed/predetermined reference data to the removable data storage item.

18 Claims, 2 Drawing Sheets

| FOREIGN PATENT DOCUMENTS | | | JP | 2004200827 | 7/2004 |
|---|---|---|---|---|---|
| EP | 0890151 | 6/2004 | WO | 03034425 | 4/2003 |
| GB | 2435333 | 8/2007 | * cited by examiner | | |

DATA TRANSFER DEVICE

CROSS-REFERENCE TO RELATED APPLICATION

This patent application claims priority to United Kingdom Patent Application Number 0803052.0, entitled "Data Transfer Device" filed on 20 Feb. 2008.

FIELD OF THE INVENTION

The present invention relates to a data transfer device for transferring data between a host device and a removable data storage item, wherein data are encrypted or decrypted by the data transfer device during data transfer.

BACKGROUND OF THE INVENTION

Data backup is a valuable tool in safeguarding important data. Data are generally backed-up onto removable data storage items, such as tape cartridges or optical discs, such that the backup data may be stored at a different geographical location to the primary data.

By storing important data onto removable data storage items, security issues become a consideration. For example, a visitor to a site might easily pocket a tape cartridge storing large amounts of commercially sensitive data.

Many backup software packages provide the option of encrypting data prior to backup. A drawback with this approach, however, is that the same software package must be used in order to retrieve and decrypt the backup data.

Accordingly, backup data cannot be recovered using other legitimate systems where the backup software is not provided. Additionally, software encryption increases the time required to backup data and consumes valuable computer resources.

SUMMARY OF THE INVENTION

An embodiment of the present invention provides a data transfer device for transferring data to a removable data storage item, the data transfer device being operable to:
(a) receive content data to be stored to the removable data storage item;
(b) encrypt the content data using an encryption key;
(c) transform at least one of predetermined reference data and the encryption key;
(d)(i) encrypt the transformed predetermined reference data using the encryption key; or
(d)(ii) encrypt the predetermined reference data using the transformed encryption key; and
(e) store the encrypted content data and the encrypted transformed/predetermined reference data to the removable data storage item.

In one embodiment, the data transfer device is operable to:
(c) transform at least one of predetermined reference data and the encryption key by encrypting said one of predetermined reference data and the encryption key using the encryption key.

In one embodiment, the data transfer device is operable to:
(c) transform the encryption key by performing a logical operation on the encryption key.

In one embodiment, the logical operation comprises exclusive disjunction.

In one embodiment, the logical operation comprises inverting the encryption key.

In one embodiment, the data transfer device is operable to store the encrypted content data as one or more data blocks, and to store a copy of the encrypted transformed/predetermined reference data with each data block.

In one embodiment, each data block comprises a data region and an information table, and a copy of the encrypted transformed/predetermined reference data is stored in the information table.

In one embodiment, the data transfer device is operable to store the encrypted data in a format selected from one of the generations of LTO and DDS/DAT formats.

In one embodiment, the content data is received as one or more records and a copy of the predetermined reference data is provided within a record.

In one embodiment, the data transfer device is operable to compress the content data prior to encryption.

In one embodiment, the data transfer device stores a copy of the encryption key and is suitable for transferring data from the removable data storage item, the data transfer device being operable to:
retrieve the encrypted content data from the removable data storage item;
decrypt the encrypted content data using the encryption key stored by the data transfer device; and
output the decrypted content data.

In one embodiment, the data transfer device additionally stores a copy of the encrypted transformed/predetermined reference data and is operable to:
retrieve the encrypted transformed/predetermined reference data from the removable data storage item;
compare the encrypted transformed/predetermined reference data retrieved from the removable data storage item with the encrypted transformed/predetermined reference data stored by the data transfer device; and
generate an error message in the event that the reference data retrieved from the removable data storage item does not substantially correspond with the reference data stored by the data transfer device.

In one embodiment, retrieving the encrypted transformed/predetermined reference data, comparing the reference data and generating an error message are performed in the event that the encrypted content data cannot be successfully decrypted using the encryption key stored by the data transfer device.

In one embodiment, the data transfer device in comparing reference data is operable to determine the number of locations at which the reference data retrieved from the removable data storage item and the encrypted transformed/predetermined reference data stored by the data transfer device differ, and the data transfer device is operable to generate the error message in the event that the number of locations is greater than a predetermined value.

An embodiment of the present invention provides a data transfer device for transferring data to a removable data storage item, the data transfer comprising:
(a) means for receiving content data to be stored to the removable data storage item;
(b) means for encrypting the content data using an encryption key;
(c) means for transforming at least one of predetermined reference data and the encryption key;
(d)(i) means for encrypting the transformed predetermined reference data using the encryption key; or
(d)(ii) means for encrypting the predetermined reference data using the transformed encryption key; and (e) means to store the encrypted content data and the encrypted transformed/predetermined reference data to the removable data storage item.

In one embodiment, the data transfer device is configured such that there is no correlation between any known CTR value encrypted using the encryption key and at least one of:
the transformed predetermined reference data encrypted using the encryption key; and
the predetermined reference data encrypted using the transformed encryption key.

An embodiment of the present invention provides a data transfer device for transferring data to a removable data storage item, the data transfer device being operable to:
receive content data to be stored to the removable data storage item;
encrypt the content data using an encryption key;
iteratively encrypt predetermined reference data using the encryption key for at least two cycles;
store the encrypted content data and the iteratively encrypted predetermined reference data to the removable data storage item.

An embodiment of the present invention provides a data transfer device for transferring data to a removable data storage item, the data transfer device being operable to:
receive content data to be stored to the removable data storage item;
encrypt the content data using an encryption key;
invert the encryption key;
encrypt predetermined reference data using the inverted encryption key; and
store the encrypted content data and the encrypted predetermined reference data to the removable data storage item.

In one embodiment, the data transfer device is a tape drive and the removable data storage item is a tape cartridge.

In one embodiment, the data transfer device is operable to encrypt data according to the counter (CTR) mode of the advanced encryption standard (AES).

An embodiment of the present invention provides a method of operating a data transfer device for transferring data to a removable data storage item, the method comprising:
(a) receiving content data to be stored to the removable data storage item;
(b) encrypting the content data using an encryption key;
(c) transforming at least one of predetermined reference data and the encryption key;
(d)(i) encrypting the transformed predetermined reference data using the encryption key; or
(d)(ii) encrypting the predetermined reference data using the transformed encryption key; and
(e) storing the encrypted content data and the encrypted transformed/predetermined reference data to the removable data storage item.

In one embodiment, transforming at least one of predetermined reference data and the encryption key comprises encrypting said one of predetermined reference data and the encryption key using the encryption key.

In one embodiment, transforming the encryption key comprises performing a logical operation on the encryption key.

In one embodiment, the logical operation comprises inverting the encryption key.

The present invention provides a computer program product storing computer program code executable by a data transfer device to perform the aforementioned method.

BRIEF DESCRIPTION OF THE DRAWINGS

In order that the present invention may be more readily understood, embodiments thereof will now be described, by way of example, with reference to the accompanying drawings, in which.

DETAILED DESCRIPTION

Figure 1:
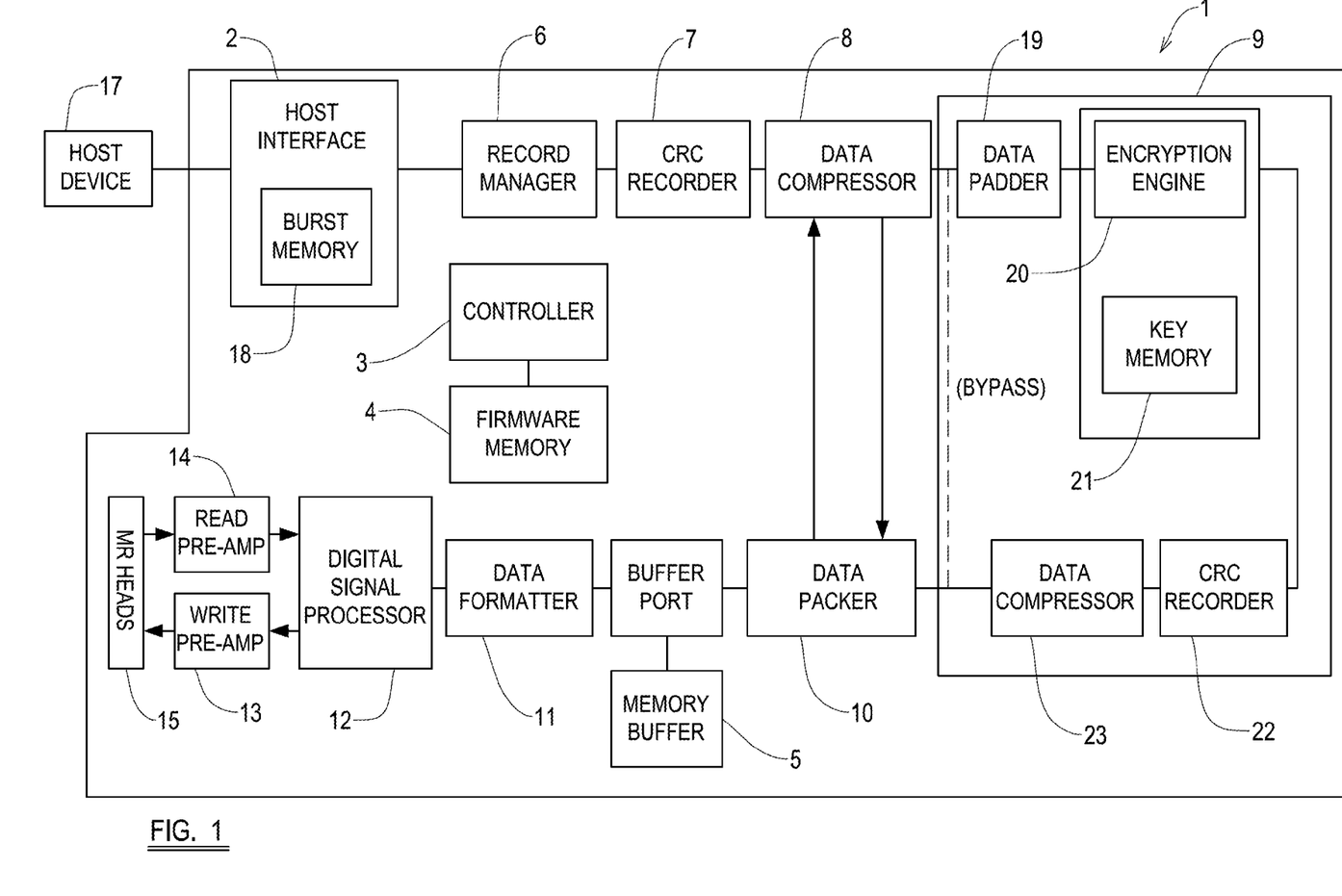
FIG. 1 is a schematic block diagram of a tape drive embodying the present invention.

The tape drive 1 of FIG. 1 comprises a host interface 2, a controller 3, a firmware memory 4, a memory buffer 5, a record manager 6, a CRC recorder 7, a data compressor 8, a data encryptor 9, a data packer 10, a data formatter 11, a digital signal processor 12, write 13 and read 14 pre-amplifiers, and magneto-resistive heads 15. With the exception of the data encryptor 9 and the software stored in the firmware memory 4, the components of the tape drive 1 are identical to those employed in conventional linear-tape-open (LTO) tape drives.

The host interface 2 controls the exchange of data between the tape drive 1 and a host device 17. Control signals received from the host device 17 by the interface 2 are delivered to the controller 3, which, in response, controls the operation of the tape drive 1. Data received from the host device 17 typically arrives in high speed bursts and the host interface 2 includes a burst memory 18 for storing data received from the host device 17. The data may comprise content data to be stored to the removable data storage item.

The controller 3 comprises a microprocessor, which executes instructions stored in the firmware memory 4 to control the operation of the tape drive 1.

The record manager 6 retrieves data from the burst memory 18 of the host interface 2 and appends record boundaries. The CRC recorder 7 then appends a cyclic redundancy check (CRC) to each record. Each of the protected records is then compressed by the data compressor 8 using LTO scheme-1 (ALDC) compression. The integrity of the compressed records is then verified by the data compressor 8, after which the compressed records are delivered to the data encryptor 9.

The data encryptor 9 comprises a data padder 19, an encryption engine 20, a key memory 21, a CRC recorder 22 and a data compressor 23. The CRC recorder 22 and data compressor 23 of the data encryptor 9 shall be referred to hereafter as the encrypt CRC recorder 22 and encrypt data compressor 23 so as to distinguish them from the other CRC recorder 7 and data compressor 8.

As described below, the data encryptor 9 employs block encryption, each block having 128 bits. The data padder 19 therefore appends an end-of-record (EOR) codeword to each compressed record and pads each compressed record with redundant data (e.g. with zeros) such that each compressed record is an integral number of 128 bits.

The encryption engine 20 employs a Galois Counter Mode (GCM) encryption algorithm to encrypt each padded, compressed record. The key memory 21 may be volatile or non-volatile, depending on the intended applications of the tape drive 1, and stores a 256-bit encryption key that is used by the encryption engine 20. Other keys such as a 128 or a 192 bit key may also be used. The Galois/Counter Mode is specified in "The Galois/Counter Mode of Operation" by David A. McGrew and John Viega available from NIST/CSRC. The encryption engine 20 may employ other modes of encryption.

The encryption engine 20 divides each padded, compressed record into blocks of 128 bits. Each block is then encrypted using the encryption key held in key memory 21 and a counter value.

After data encryption, the encryption engine 20 appends an initialisation vector (sometimes referred to as an initial vector) to the beginning of the blocks of ciphertext and an authentication tag to the end of the blocks of ciphertext to create a pseudo-record. The initialisation vector is the counter value for the first block of ciphertext of the pseudo-record (i.e. block number=0), whilst the authentication tag is generated in accordance with the GCM specification and comprises a form of checksum data generated over the data of a record. The tag may also be generated over any additional authenticated data (AAD) which may or may not be prefixed to each record. The tag, AAD and prefixing AAD are all concepts enshrined in the GCM and IEEE1619.1 standards.

The pseudo-record, comprising the IV, blocks of ciphertext and authentication tag, is delivered to the encrypt CRC recorder 22, which appends a CRC to the pseudo-record to create a protected pseudo-record. The protected pseudo-record is then delivered to the encrypt data compressor 23, which compresses the protected pseudo-record using LTO scheme-2 (no-compress) compression. Owing to encryption, the pseudo-record comprises random data and therefore the pseudo-record is incompressible. It is for this reason that scheme-2 compression is employed. Although no compression is actually achieved, the compressed pseudo-record consists of LTO codewords (e.g. compression, scheme and reset codewords). Consequently, the compressed pseudo-record is LTO compliant.

The compressed encrypted pseudo-record is then delivered to the data packer 10, which appends an EOR codeword to the compressed pseudo-record and packs sequential compressed pseudo-records together to form a compressed data stream, which is then written to the memory buffer 5.

Figure 2:
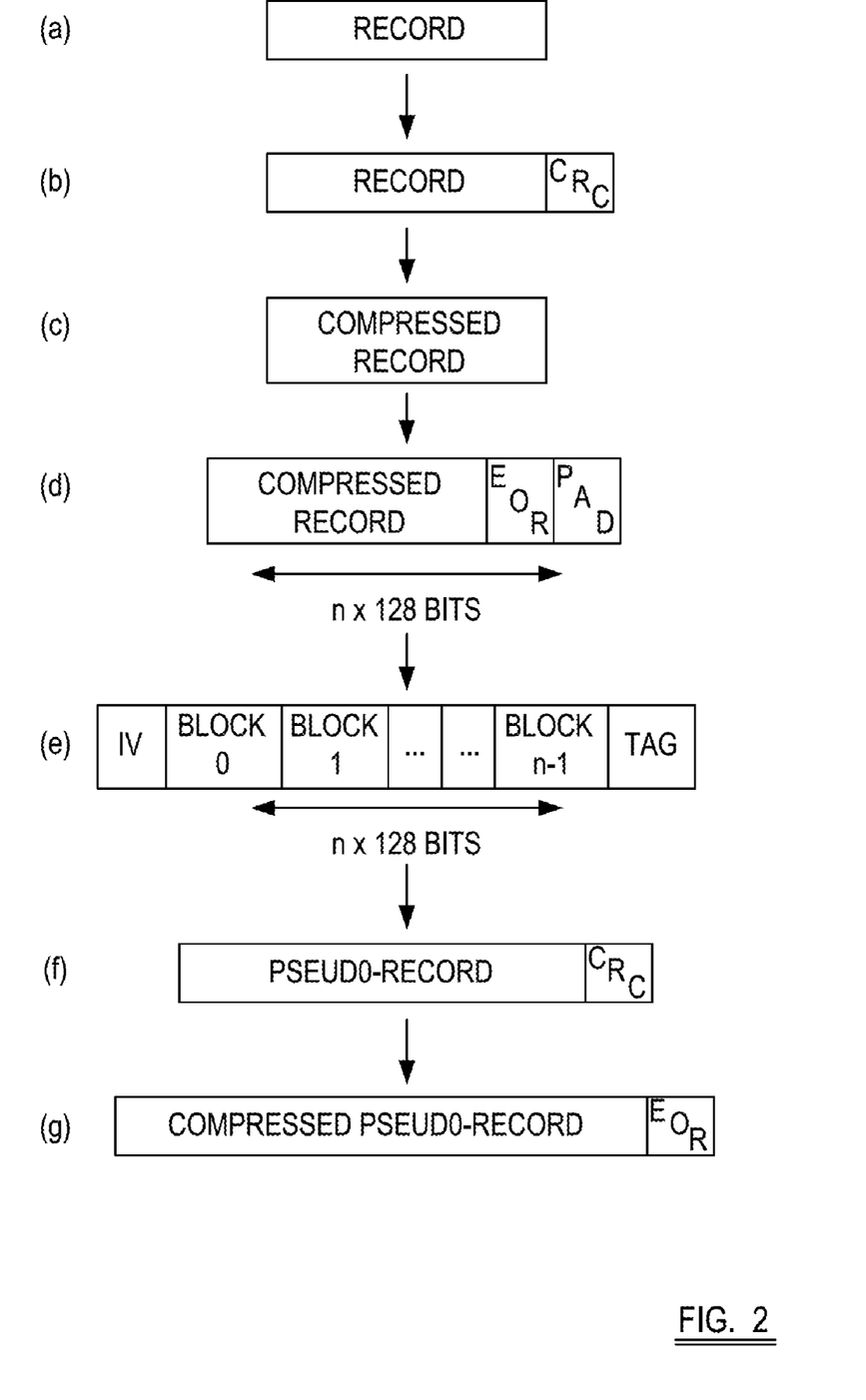
FIG. 2 illustrates a record at various stages of formatting by the tape drive of FIG. 1.

FIG. 2 illustrates a record received from the host device 17 at various stages of formatting by the tape drive 1. FIG. 2(a) illustrates the record as received by the tape drive 1, which may be of any size. FIG. 2(b) illustrates the record after processing by the CRC recorder 6, and FIG. 2(c) illustrates the protected record after compression by the data compressor 8. FIG. 2(d) illustrates the compressed record after formatting by the data padder 19. FIG. 2(e) illustrates the pseudo-record created after encryption. FIG. 2(f) illustrates the pseudo-record after processing by the encrypt CRC recorder 22, and FIG. 2(g) illustrates the protected pseudo-record after compression by the encrypt data compressor 23 and the data packer 10. LTO format specifies also that records must be padded to a 32 bit boundary hence the potential use of a 4-byte pad appended to the end of the pseudo-record.

As in conventional LTO tape drives, the controller 3 then divides or partitions the compressed data stream into data chunks of a predetermined size (e.g. 403884 bytes for LTO1/LTO2 and 1616940 for LTO3/LTO4) and appends a data set information table (DSIT) to each data chunk to create a data set. In LTO1, LTO2, LTO3 and LTO4 formats, the DSIT comprises 468 bytes. Each data set is then delivered to the data formatter 11, which ECC-encodes the data set, randomises the ECC-encoded data to remove long sequences, and RLL encodes the randomised data. The RLL-encoded data are then processed by the digital signal processor 12 and delivered, via the write pre-amplifier 13, to write head elements 15 which write the data set to a magnetic tape.

The read process is basically the reverse of the write process. In response to a request to retrieve a particular record, the tape drive 1 first locates the relevant data set or group of data sets. The data set is then read from the tape by read head elements 16 which generate an analogue signal. The analogue signal is then amplified by the read pre-amplifier 14 and processed by the digital signal processor 12 to generate a digital data stream. The digital data stream is then RLL-decoded, unscrambled and ECC-decoded by the data formatter 11 to create the data set.

The chunk of data corresponding to the data region of the data set is then delivered to the data packer 10, which unpacks the chunk of data to create one or more compressed pseudo-records. The location of each compressed pseudo-record is determined by the EOR codewords previously appended by the data packer 10 during data storage.

Each compressed pseudo-record is then decompressed by means of the encrypt data compressor 23. The CRC appended to each pseudo-record is discarded by the encrypt data compressor 23 and the resulting pseudo-records are delivered to the encryption engine 20, which then decrypts the pseudo-records. The encryption engine 20 uses the encryption key stored in key memory 21 and the initialization vector stored at the beginning of each pseudo-record to decrypt the pseudo-records and generate in response padded, compressed records.

The padded, compressed records are then delivered to the data compressor 8, which decompresses the records. Owing to the presence of the EOR codeword, the data compressor 8 ignores any padding to the compressed records.

The controller 3 then reads each of the retrieved records in turn until the requested record is identified, whereupon it is delivered to the host device 11 via the host interface 2.

Each read and write command issued by the host device 17 is accompanied by an encryption key. The tape drive 1, upon receiving a command, stores the accompanying encryption key in key memory 21 for subsequent use by the encryption engine 20. Data to be written or read by the tape drive 1 are then encrypted or decrypted using the encryption key stored in key memory 21.

When a new command is received by the tape drive 1, the accompanying encryption key overwrites the contents of the key memory 21. When no encryption or decryption is required, the read or write command is accompanied by a blank encryption key. Alternatively, once a command has been completed by the tape drive 1, the encryption key may be erased from the key memory 21 such that subsequent commands are performed without data encryption/decryption occurring.

Rather than an encryption key accompanying each read and write command, the host device 17 may alternatively issue a special SET_KEY command, which includes the encryption key to be stored. The tape drive 1, in response to receiving the SET_KEY command, stores the received encryption key to key memory 21 for subsequent use by the encryption engine 20. In this alternative embodiment, the contents of the key memory 21 are unchanged until such time as a new SET_KEY command is received and the contents of the key memory 21 are overwritten.

By permitting different encryption keys to be used during operation, data may be stored to tape using a plurality of different encryption keys so as to further increase data security.

If a new encryption key is received during data write, the controller 3 appends an end-of-marker codeword followed by redundant data to the compressed data stream such that the current, partial data chunk (i.e. data region) is padded to the required, predetermined size (i.e. 403884 bytes for LTO1/LTO2 and 1616940 for LTO3/LTO4). By padding the compressed data stream in this manner whenever a new encryption key is received, each data set comprises only records that have been encrypted using the same encryption key. Consequently, locating and retrieving a record within a particular data set requires the provision of only one encryption key.

If an incorrect encryption key is employed by the tape drive 1 when retrieving encrypted data from tape, the data compressor 8 will generate an error on the basis that the record length and/or the CRC data of the decompressed record is incorrect. The data compressor 8, however, will also generate an error during data retrieval if the encrypted data read back from the tape is itself corrupt, regardless of whether or not the correct encryption key has been used. Accordingly, it is not always possible to reliably determine the cause of a data retrieval error.

In order that the tape drive 1 may reliably determine the cause of a data retrieval error, it is known to store to tape a self-encrypted copy of the encryption key content along with any content data encrypted using that particular encryption key. In the event that an error occurs during subsequent data retrieval, the copy of the self-encrypted encryption key is retrieved from tape. A copy of the encryption key stored in key memory 21 is then encrypted by the encryption engine 20 to create a second self-encrypted encryption key, and the two self-encrypted encryption keys are compared.

If the two self-encrypted encryption keys correspond, a positive verification is made that the encryption key stored in key memory 21 is the correct encryption key for the data being retrieved. The cause of the error generated during data retrieval can therefore be positively identified as corrupt data read back from tape. Conversely, if the two keys do not correspond, the cause of the error can be positively identified as the use of an incorrect encryption key for the data being retrieved.

GB 2,435,333 discloses various methods for storing a self-encrypted copy of the encryption key to tape, and subsequently retrieving the self-encrypted key from tape in order to determine the cause of a data retrieval error. The features disclosed in GB 2,435,333 may readily be incorporated with those of the present invention and all of the disclosure of GB 2,435,333 is incorporated herein by reference, to the extent that the features are compatible. Their compatibility will readily be appreciated by the skilled person.

In the embodiments described in GB 2,435,333, a self-encrypted copy of an encryption key is stored to tape. Since the encryption key serves as both the plaintext and encryption key, it may be difficult for a third party to extract the encryption key from the ciphertext. In an alternative arrangement disclosed in GB 2,435,333, rather than storing an encrypted copy of the encryption key, an encrypted copy of predetermined reference data is instead stored to tape. In order to verify that that the encryption key stored in key memory is the correct key for the data being retrieved, the controller encrypts the reference data using the encryption engine and compares the result with the encrypted reference data stored on tape. The reference data is not intended to be kept secret and it is assumed to be publicly available. For example, the reference data may be derived from the serial number of the tape cartridge onto which data are to be stored, or it may be a fixed value stored within the tape drive on non-volatile memory. The reference data could be any constant value. Since the plaintext in this alternative embodiment is now known, the encryption algorithm employed by the encryption engine creates the ciphertext (i.e. an encrypted copy of the reference data) in a manner which does not permit the encryption key to be easily recovered. A suitable algorithm includes GCM encryption.

The transfer device 1 embodying the present invention may be operable to encrypt data according to the counter (CTR) mode of the advanced encryption standard (AES). According to the CTR method, a first value of a counter is encrypted using the encryption key. The encrypted first CTR value of the counter is then XORed with the first string of plaintext of the content data to produce ciphertext. The counter is then incremented by a predetermined value and the new counter value is encrypted using the encryption key, preferably the same key. The encrypted second CTR value is then XORed with a second string of plaintext of the content data to produce ciphertext. In some embodiments, the first CTR value may be encrypted and used for authentication purposes; with only the second CTR value being encrypted and XORed with the first string of plaintext.

There may exist a situation where a tape drive employing the CTR mode of encryption uses predetermined reference data which is equal to a particular one of all the possible CTR values. In such a situation, there is an increased risk that the plaintext of the content data may be exposed to a third party attacking the encrypted data.

This is because a potential attacker has access to: the ciphertext corresponding to the content data; the initial value of CTR for each record (because the initialisation value (IV) is prefixed to records); and the encrypted predetermined reference data stored on the tape—known as the key signature.

Consequently, when the predetermined reference data is equal to a particular CTR value, then it follows that the encrypted predetermined reference data is equal to the encrypted CTR value.

As described above, the ciphertext is the encrypted predetermined reference data XORed with the plaintext. Conversely, the nature of an XOR operation dictates that the plaintext is equal to the ciphertext XORed with the encrypted CTR value. In the above situation, the attacker is aware of the encrypted CTR value (because it is equal to the encrypted predetermined reference data—the key signature); has access to the ciphertext; and thus would be able to deduce the plaintext data from the ciphertext.

Accordingly, in employing the known data transfer devices with the CTR method of encryption, it has been necessary to ensure that the predetermined reference data may never equal any one of the possible CTR values that may be used during an encryption process However, such limitation restricts the free implementation of such a data transfer device and does not allow substantially unhindered selection of the predetermined reference data.

With embodiments of the present invention, the predetermined reference data may equal any value, including any of the possible CTR values, if applicable. Embodiments of the present invention are therefore not restricted to the extent of known data transfer devices 1 and, moreover, are less susceptible to attacks by a third party.

In a first embodiment of the present invention, the data transfer device 1 is operable to iteratively encrypt predetermined reference data using the encryption key for at least two cycles. In other words, the predetermined reference data is encrypted using the encryption key. Then, the encrypted predetermined reference data is further encrypted, again using the encryption key. In one embodiment, the two encryption keys are identical. In one embodiment, utilising asymmetric encryption, one key may be a private key and the other key a public key—the two keys corresponding to one another.

In other embodiments, there may be multiple cycles of iterative encryption of the predetermined reference data using the encryption key, at least two of which iterations may use the same or corresponding encryption keys.

In iteratively encrypting the predetermined reference data, the predetermined reference data can be said to have been 'transformed'.

A data transfer device 1 embodying the invention is operable to receive content data to be stored to the removable storage item and encrypt the content data using the encryption key. Both the encrypted content data and the iteratively encrypted predetermined reference data are then stored to the removable storage item.

A benefit of such an embodiment is that the value of the iteratively encrypted predetermined reference data will not be equal to any encrypted CTR value, even if the predetermined reference data is equal to the CTR value. Security may therefore be improved due to the iterative encryption of the predetermined reference data In a second embodiment of the present invention, the data transfer device is operable to create an inverted version of the encryption key. The inverted encryption key may be produced by XORing the encryption key with a string of 1s, the string having the same number of bits N as the encryption key. The predetermined reference data is then encrypted using the inverted encryption key.

As with the above-described embodiment, the data transfer device is operable to store the encrypted content data and the encrypted predetermined reference data to the removable data storage item.

A benefit of the second embodiment is that the value of the predetermined reference data encrypted with the inverted encryption key will not be equal to any known encrypted CTR value, even if the predetermined reference data is equal to the CTR value. In other words, an attacker may not correlate the so-encrypted predetermined reference data with the encrypted CTR value, because the encryption key was inverted during the encryption of the predetermined reference data. Security may therefore be improved due to the inversion of the encryption key used to encrypt the predetermined reference data In the above described second embodiment, an inverted version of the encryption key is created. In other embodiments, any one or more of a number of available logical operations may be performed on the encryption key. In one embodiment, the encryption key may be XORed with a constant. In another embodiment, the encryption key may be XORed with a string consisting of 1s and 0s. As an illustrative example, the string may comprise 11110000, if the encryption key is 8 bits long. In one embodiment, the encrypted key may be a 128-bit encryption key (thus may be XORed with a string of 128 bits). However, the present invention is applicable to the use of encryption keys of any known or future size, including but not limited to 64-bit and 256-bit encryption keys.

In any event, with either inversion or XORing the encryption key with a string or constant, the encryption key is 'transformed', thereby creating a transformed encryption key.

In the first embodiment, as described above, the predetermined reference data is iteratively encrypted using the encryption key for at least two cycles. In other words, the predetermined reference data has been transformed (encrypted), and that transformed predetermined reference data is then encrypted using the encryption key.

In the second embodiment, an inverted (or otherwise modified) version of the encryption key is created, and the predetermined reference data is then encrypted using the inverted/modified encryption key. In other words, the encryption key has been transformed, and the predetermined reference data is then encrypted using the transformed encryption key.

The first and second embodiments are not to be seen as mutually exclusive. It will readily be apparent that features of both embodiments may be combined. For example, both the predetermined reference data and the encryption key may be transformed. The transformed predetermined reference data may then be encrypted using the transformed encryption key.

The transformation of the encryption key may comprise inverting the key and encrypting the inverted key, using the encryption key.

An embodiment of the present invention provides a data transfer device for transferring data to a removable data storage item, the data transfer device being operable to:
  (a) receive content data to be stored to the removable data storage item;
  (b) encrypt the content data using an encryption key;
  (c) transform at least one of predetermined reference data and the encryption key;
  (d)(i) encrypt the transformed predetermined reference data using the encryption key; or
  (d)(ii) encrypt the predetermined reference data using the transformed encryption key; and
  store the encrypted content data and the encrypted transformed/predetermined reference data to the removable data storage item.

In an embodiment, transforming the at least one of predetermined reference data and the encryption key comprises encrypting said one of predetermined reference data and the encryption key using the encryption key.

In another embodiment, transforming the at least one of predetermined reference data and the encryption key comprises performing a logical operation on one of said predetermined reference data and the encryption key using the encryption key.

In an embodiment, the logical operation comprises exclusive disjunction (XOR).

Data transfer devices embodying the present invention are operable to store the encrypted content data as one or more data blocks, and to store a copy of the encrypted transformed/predetermined reference data with each data block.

In one embodiment, each data block comprises a data region and an information table, and a copy of the encrypted transformed/predetermined reference data is stored in the information table.

In addition to the encryption key being stored in key memory 21, the encrypted transformed/predetermined reference data may also be stored in the key memory. In one embodiment, the key memory may also store a copy of the predetermined reference data, or at least be configured to locate the predetermined reference data.

By "encrypted transformed/predetermined reference data" is meant one of
  i) the transformed predetermined reference data, encrypted using the encryption key; or
  ii) the predetermined reference data, encrypted using the transformed encryption key.

The term is used herein for the purposes of brevity.

In an embodiment of the present invention, the host device 17 delivers to the tape drive 1 a copy of the encrypted transformed/predetermined reference data in the form of a data record. This data record, which shall be referred to hereafter as an encrypt data record, is formatted by the tape drive 1 in the same manner as that for a conventional data record, i.e. the encrypt data record is compressed by the data compressor 8, encrypted by the data encryptor 9, and appended to the compressed data stream by the data packer 10.

The host device 17 delivers an encrypt data record at the beginning of a data write process. In particular, the host device 1 delivers the encrypt data record prior to any user data records. Additionally, the host device 1 delivers an encrypt data record whenever a change in encryption key occurs.

Since a new data set is created at the beginning of each write process or whenever a change in the encryption key has occurred, an encrypt data record will be recorded as the first record of a data set. The tape drive 1 updates the directory of the tape such that each data set storing an encrypt data record is labelled as such. Accordingly, when encrypted data are to be later retrieved, the data set storing the relevant encrypt record can be quickly and easily identified.

When data are to be retrieved from tape, the host device 17 reads the contents of the tape directory. Using the contents of the tape directory, the host device 17 determines the location of the data set(s) that comprises the requested data record(s). The host device 17 then issues commands to the tape drive 1 requesting that the identified data set(s) be retrieved from tape and delivered to the host device 17. In response to the data read command, the tape drive 1 retrieves the identified data set(s) from tape, processes the data set(s) in the manner described above, and delivers the data records contained therein to the host device 17. If the tape drive 1 returns an error during data retrieval, the host device 17 determines, from the contents of the tape directory, the location of the data set that comprises the relevant encrypt data record. The host device 17 then delivers a KEY_CHECK command to the tape drive 1 along with the location of the data set storing the encrypt data record. In response, the tape drive 1 retrieves the relevant data set and processes the data set so as to obtain the encrypt data record. The controller 3 then extracts the encrypted transformed/predetermined reference data from the encrypt data record and compares this against the encrypted transformed/predetermined reference data stored in the key memory 21.

If the two encrypted transformed/predetermined reference data correspond, a positive verification is made of the encryption key stored in key memory 21 and the tape drive 1 returns a KEY_CORRECT message to the host device 17. Because the two encrypted transformed/predetermined reference data correspond, it follows that the encryption keys used to create them must also correspond. Since the two keys correspond, the initial error generated by the tape drive 1 during data retrieval cannot be attributed to an incorrect encryption key being used for decryption. Consequently, in response to receiving a KEY_CORRECT message, the host device 17 outputs an error indicating that the requested data record(s) is corrupt.

If the two encrypted transformed/predetermined reference data do not correspond, the tape drive 1 determines whether or not the copy of the encrypted transformed/predetermined reference data stored on tape is itself corrupt. Two possible examples for determining whether the encrypted transformed/predetermined reference data stored on tape is corrupt will now be described.

In the first example, the encrypted transformed/predetermined reference data stored to tape is protected with an error correction code (ECC) or a data redundancy check. The encrypt data record then comprises both the encrypted transformed/predetermined reference data and the ECC. If the encrypted transformed/predetermined reference data read back from tape is corrupt and cannot be repaired by means of the ECC, the tape drive 1 delivers a KEY_CORRUPT message to the host device 17. If, however, the ECC or redundancy check indicates that the encrypted transformed/predetermined reference data read back from tape is not corrupt, the tape drive 1 delivers a KEY_INCORRECT message to the host device 17.

In response to receiving a KEY_CORRUPT message, the host device 17 outputs an error indicating that the tape is corrupt. In response to receiving a KEY_INCORRECT message, the host device 17 outputs an error indicating that the data record(s) being retrieved was encrypted using a different encryption key to that stored in key memory 21.

In the second example, the number of bytes that differ between the two encrypted transformed/predetermined reference data is used to determine whether the encrypted transformed/predetermined reference data retrieved from tape is corrupt. Corruption of the encrypted transformed/predetermined reference data retrieved from tape is likely to be restricted to a small number of bytes. In contrast, two different encryption keys (or two encrypted transformed/predetermined reference data) are likely to differ at many or all byte locations. Accordingly, in the second example, the controller 3 determines the number of byte locations at which a difference exists between the encrypted transformed/predetermined reference data retrieved from tape and encrypted transformed/predetermined reference data stored in key memory 21. The tape drive 1 additionally stores a predetermined number, which shall be referred to hereafter as the BYTE_ERROR_THRESHOLD. The value of BYTE_ERROR_THRESHOLD will depend upon the tape format or implementation being employed. If the number of differing byte locations determined by the controller 3 is lower than or equal to the BYTE_ERROR_THRESHOLD, this suggests a corrupt rather than incorrect encryption key read back from tape and the tape drive 1 therefore delivers a KEY_CORRUPT message to the host device 17. If, however, the number of differing byte locations determined by the controller 3 is greater than the BYTE_ERROR_THRESHOLD, this suggests an incorrect rather than corrupt encryption key read back from tape and the tape drive 1 therefore delivers a KEY_INCORRECT message to the host device 17.

As with the first example, the host device 17 outputs an error indicating that the tape is corrupt in response to receiving a KEY_CORRUPT message, and outputs an error indicating that the data record(s) being retrieved was encrypted using a different encryption key to that stored in key memory 21 in response to receiving a KEY_INCORRECT message.

In both examples, the tape drive 1 delivers to the host device 17 one of three possible messages in response to a KEY_CHECK command. The first message is KEY_CORRECT, which indicates that the encryption key stored in key memory 21 is the correct key for the data being retrieved. The second message is KEY_INCORRECT, which indicates that the encryption key stored in key memory 21 is not the correct key for the data being retrieved. The third message is KEY_CORRUPT, which indicates that the encrypted transformed/predetermined reference data retrieved from tape is corrupt.

Consequently, the host device 17 is able to determine the cause of a data retrieval error. In particular, the host device 17 is able to determine whether data being retrieved is corrupt or whether the encryption key being used for decryption is incorrect.

The two examples described above are not exclusive and may be combined to better determine whether or not the encrypted transformed/predetermined reference data stored on tape is corrupt.

In an alternative embodiment for writing and retrieving a copy of the encrypted transformed/predetermined reference data to tape, the DSIT of each data set includes a field that stores a copy of the encrypted transformed/predetermined reference data. For example, the first 228 bytes of the DSIT is reserved for manufacturer use and would provide a suitable location for storing a copy of the encrypted transformed/predetermined reference data, which may occupy only 16 bytes (for predetermined reference data of 128 bits) or 32 bytes (for predetermined reference data of 192 or 256 bits)

The controller 3, when appending a DSIT to the data region of a data set (i.e. when appending a DSIT to each data chunk of the compressed data stream), copies the encrypted transformed/predetermined reference data to the DSIT of the data set.

When data are to be retrieved from tape, the host device 17 first reads the contents of the tape directory. Using the contents of the tape directory, the host device 17 determines the location of the data set(s) that comprises the requested data record(s). The host device 17 then issues a command to the tape drive 1 requesting that the identified data set(s) be retrieved from tape and delivered to the host device 17. If the tape drive 1 returns an error during data retrieval, the host device 17 in response delivers a KEY_CHECK command to the tape drive 1 along with the identity of the data set. In response, the tape drive 1 retrieves the encrypted transformed/predetermined reference data from the DSIT of the data set and compares this against the encrypted transformed/predetermined reference data that is stored in key memory 21.

In the same manner as that described above for the first embodiment, the tape drive 1 then determines whether the encrypted transformed/predetermined reference data retrieved from tape is corrupt, or whether it corresponds or differs from the encrypted transformed/predetermined reference data stored in key memory. In particular, the tape drive 1 returns one of three possible messages in response to a KEY_CHECK command, namely KEY_CORRECT, KEY_INCORRECT and KEY_CORRUPT.

In the embodiments described above, the tape drive 1 returns an error signal to the host device 17 should a problem occur during data retrieval. The host device 17 in response delivers a KEY_CHECK command to the tape drive 1, which in response returns to the host device 17 one of three possible messages, namely KEY_CORRECT, KEY_INCORRECT and KEY_CORRUPT. In an alternative embodiment, the tape drive 1 upon detecting an error during data retrieval immediately enters key-checking mode. In particular, the tape drive 1 does not wait for a KEY_CHECK command to be received but instead behaves in the manner described above as if a KEY_CHECK command had been received. If the encrypted transformed/predetermined reference data is stored in the DSIT of a data set, the tape drive 1 retrieves the from the DSIT of the data set for which an error has occurred.

Since both KEY_CORRECT and KEY_CORRUPT messages are indicative of a corrupt tape, the tape drive 1 need only return one of two possible messages to the host device 17 in the event that an error occurs data retrieval. The first message is TAPE_CORRUPT (which replaces both KEY_CORRECT and KEY_CORRUPT) and is generated should the tape drive 1 determine that the encryption key stored in key memory 21 is correct or the encrypted transformed/predetermined reference data retrieved from tape is corrupt). The second message is KEY_INCORRECT and is generated, as described above, should the tape drive 1 determine that the encryption key stored in key memory 21 is incorrect. Consequently, the tape drive 1, in response to receiving a read command, returns to the host device 17 the requested data, a TAPE_CORRUPT message, or a KEY_INCORRECT message.

In the embodiments described above, the tape drive 1 receives an encrypt data record comprising encrypted transformed/predetermined reference data. However, rather than receiving an encrypt data record, the tape drive 1 may alternatively create the encrypt data record whenever a new write request or a new encryption key is received.

In another embodiment described above, a copy of the encrypted transformed/predetermined reference data is written to the DSIT of each data set. However, a single copy of the encrypted transformed/predetermined reference data may alternatively be written to the tape cartridge, e.g. written to the tape header portion of the tape or to a cartridge memory. In this alternative embodiment, all data stored to the tape cartridge are encrypted using the same encryption key. In order to prevent data encrypted using different keys from being stored to a particular tape cartridge, the tape drive 1 prevents the encryption key stored in key memory 21 from being changed until such time as a new tape cartridge has been inserted, or until the contents of the tape cartridge have been erased.

Rather than creating the encrypted transformed/predetermined reference data using the encryption key and predetermined reference data stored in key memory 21 every time the encryption key is to be verified, the controller 3 optionally stores the encrypted transformed/predetermined reference data in the memory buffer 5 (or some other memory location) for subsequent use by the controller 3. Whenever a new encryption key is received by the tape drive 1, the controller 3 causes the new encryption key to be stored in the key memory 21. Additionally, the controller 3 causes the encrypted transformed/predetermined reference data to be created by the encryption engine 20, and the resulting encrypted transformed/predetermined reference data is then stored to the memory buffer 5 (or some other memory location) for subsequent use.

In the embodiments described above, the encrypted transformed/predetermined reference data is retrieved from tape and compared against the encrypted transformed/predetermined reference data stored in key memory 21. If the two encrypted transformed/predetermined reference data correspond, a positive verification is made that the encryption key stored in key memory 21 is the correct encryption key for the data being retrieved. In an alternative embodiment, the encrypted transformed/predetermined reference data retrieved from tape are decrypted by the encryption engine 20, using the encryption key stored in key memory 21. The resulting predetermined reference data is then compared against the predetermined reference data stored in key memory 21. If the two reference data correspond, a positive verification is made that the encryption key stored in key memory 21 is the correct encryption key for the data being retrieved. In this alternative embodiment, the encrypt data record stores a copy of the predetermined reference data rather than, or in addition to, the encrypted transformed/predetermined reference data.

It is assumed that the encryption key stored in key memory 21 is the correct encryption key for the data being retrieved. Accordingly, a comparison of the encrypted transformed/predetermined reference data stored on tape with that stored in key memory 21 is made only in the event that an error is generated during data retrieval, e.g. when an error is generated by the data compressor 8. This has the advantage that data may be retrieved from tape even if the encrypted transformed/predetermined reference data stored on tape is corrupt. Nevertheless, in an alternative embodiment, a comparison of the encrypted transformed/predetermined reference data stored on tape is made with the encrypted transformed/predetermined reference data stored in key memory 21 prior to the retrieval of data records. In this alternative embodiment, the tape drive 1 retrieves the data set(s) of the requested data record(s) only in the event that the two keys used to encrypt the encrypted the transformed/predetermined reference data correspond.

The tape drive 1 may be regarded as involving two formatting steps. In the first step, records received by the tape drive 1 are compressed and then encrypted to create pseudo-records. In the second step, the pseudo-records are subjected to conventional LTO formatting, i.e. the pseudo-records are protected, compressed using an LTO scheme, and packed together to form a compressed data stream. The tape drive 1 may therefore be regarded as converting records into encrypted pseudo-records which are then formatted by the tape drive 1 using conventional LTO formatting.

By creating pseudo-records, which are then formatted using conventional LTO formatting, data sets stored to tape by the tape drive 1 can be read back using conventional LTO tape drives, i.e. LTO tape drives not having means to encrypt or decrypt data. When a particular record is requested by a host device, a conventional LTO tape drive will locate and retrieve the relevant data set of group of data sets from the tape. The retrieved data set(s) is then formatted in a conventional manner by the LTO tape drive to extract one or more pseudo-records, each pseudo-record comprising an encrypted record. The pseudo-records are then delivered to the host device 17, whereupon they can be decrypted using software resident on the host device 17. The tape drive 1 therefore has the very real benefit that data stored to tape by the tape drive 1 are encrypted and yet can nevertheless be read back by conventional tape drives and decrypted using software resident on a host device.

The tape drive 1 may optionally deliver pseudo-records to the host device 17 should the tape drive 1 determine that the encryption key stored in key memory 21 is unsuitable for decrypting the pseudo-records.

Additionally, the tape drive 1 may optionally include a bypass (see FIG. 1) such that the data encryptor 9 is ignored by the tape drive 1 during data write or data read. Bypass of the data encryptor 9 may occur should no encryption key be stored in key memory 21, or if the controller 3 receives a command from the host device 17 to bypass encryption. With the exception of the data encryptor 9, the components of the tape drive 1 are identical to those of a conventional LTO tape drive. In particular, the data compressor 8 of the tape drive 1 employs an LTO compression scheme. Consequently, when the data encryptor 9 is bypassed, the tape drive 1 functions as a conventional LTO tape drive and records to be stored and/or retrieved are formatted using conventional LTO formatting.

Whilst the data encryptor 9 employs a Galois Counter Mode encryption algorithm, other encryption algorithms may alternatively be employed, including block cipher, stream cipher, symmetric and asymmetric encryption. In the case of asymmetric encryption, the key memory 21 optionally stores a decryption key in addition to an encryption key.

Although an embodiment of the present invention has been described with reference to the LTO format, the present invention is equally applicable to other data formats, particularly those data formats in which data to be stored are received as records. In particular, the pseudo-records created by the encryption engine 20 can be formatted as conventional records using alternative tape formats, such as DDS (including DAT 72, DAT 160 and DAT 320), SDLT, DLT and proprietary IBM formats. By using conventional tape formatting to format and write the pseudo-records to tape, data stored to tape by the tape drive 1 can be read back using conventional tape drives.

Moreover, although embodiments of the present invention has been described with reference to a tape drive 1, it will be appreciated that the present invention is equally applicable to other types of data transfer devices including, but not limited to, optical drives.

With the data transfer device embodying the present invention, the encryption and decryption of backup data is moved from the host device to the data transfer device. Moreover, by storing the encrypted transformed/predetermined reference data along with any data encrypted using the encryption key, the data transfer device is able to reliably determine the cause of any error that might occur during data retrieval.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A data transfer device for transferring data to a removable data storage item, the data transfer device having a microprocessor and being configured to:
   receive content data to be stored to the removable data storage item;
   encrypt the content data using an encryption key;
   transform predetermined reference data;
   encrypt the transformed predetermined reference data using the encryption key;
   store the encrypted content data and the encrypted transformed predetermined reference data to the removable data storage item; and
   in response to an error occurring when retrieving the encrypted content data from the removable data storage item, access the encrypted transformed predetermined reference data to determine a cause of the error.

2. A data transfer device according to claim 1, configured to:
   transform the predetermined reference data by encrypting the predetermined reference data using the encryption key.

3. A data transfer device according to claim 1, wherein the data transfer device is configured to store the encrypted content data as one or more data blocks, and to store a copy of the encrypted transformed predetermined reference data with each data block.

4. A data transfer device according to claim 3, wherein each data block comprises a data region and an information table, and a copy of the encrypted transformed predetermined reference data is stored in the information table.

5. A data transfer device according to claim 1, wherein the data transfer device is configured to store the encrypted content data in a format selected from one of the generations of LTO and DDS/DAT formats.

6. A data transfer device according to claim 1, wherein the content data is received as one or more records and a copy of the predetermined reference data is provided within a record.

7. A data transfer device according to claim 1, wherein the data transfer device is configured to compress the content data prior to encryption.

8. A data transfer device according to claim 1, wherein the data transfer device is configured to store a copy of the encryption key and to:

retrieve the encrypted content data from the removable data storage item;

decrypt the encrypted content data using the encryption key stored by the data transfer device; and output the decrypted content data.

9. A data transfer device for transferring data to a removable data storage item, the data transfer device having a microprocessor and being configured to:

receive content data to be stored to the removable data storage item;

encrypt the content data using an encryption key;

transform at least one of predetermined reference data and the encryption key;

perform at least one of:
encrypting the transformed predetermined reference data using the encryption key, or
encrypting the predetermined reference data using the transformed encryption key;

store the encrypted content data and the encrypted and/or transformed predetermined reference data to the removable data storage item;

store a copy of the encrypted and/or transformed predetermined reference data;

retrieve the encrypted and/or transformed predetermined reference data from the removable data storage item;

compare the encrypted and/or transformed predetermined reference data retrieved from the removable data storage item with the encrypted and/or transformed predetermined reference data stored by the data transfer device; and generate an error message in the event that the reference data retrieved from the removable data storage item does not substantially correspond with the reference data stored by the data transfer device.

10. A data transfer device according to claim 9, wherein the retrieving, the comparing, and the generating are to be performed in the event that the encrypted content data cannot be successfully decrypted using the encryption key stored by the data transfer device.

11. A data transfer device for transferring data to a removable data storage item, the data transfer device having a microprocessor and being configured to:

receive content data to be stored to the removable data storage item;

encrypt the content data using an encryption key;

iteratively encrypt predetermined reference data using the encryption key for at least two cycles;

store the encrypted content data and the iteratively encrypted predetermined reference data to the removable data storage item; and in response to an error occurring when retrieving the encrypted content data from the removable data storage item, access the iteratively encrypted predetermined reference data to determine a cause of the error.

12. A data transfer device according to claim 11, wherein the data transfer device is to further:

compare the iteratively encrypted predetermined reference data retrieved from the removable data storage item with iteratively encrypted predetermined reference data stored in a memory of the data transfer device, wherein determining of the cause of the error is based on the comparing.

13. A method of a data transfer device for transferring data to a removable data storage item, comprising:

receiving content data to be stored to the removable data storage item;

encrypting the content data using an encryption key;

inverting the encryption key;

encrypting predetermined reference data using the inverted encryption key;

storing the encrypted content data and the encrypted predetermined reference data to the removable data storage item; and in response to an error occurring when retrieving the encrypted content data from the removable data storage item, accessing the encrypted predetermined reference data to determine a cause of the error.

14. A method according to claim 13, further comprising:

comparing the encrypted predetermined reference data retrieved from the removable data storage item with encrypted predetermined reference data stored in a memory of the data transfer device, wherein determining of the cause of the error is based on the comparing.

15. A data transfer device for transferring data to a removable data storage item, the data transfer device having a microprocessor and being configured to:

receive content data to be stored to the removable data storage item;

encrypt the content data using an encryption key;

transform the encryption key;

encrypt predetermined reference data using the transformed encryption key;

store the encrypted content data and the encrypted predetermined reference data to the removable data storage item; and in response to an error occurring when retrieving the encrypted content data from the removable data storage item, access the encrypted predetermined reference data to determine a cause of the error.

16. A data transfer device according to claim 15, configured to:

transform the encryption key by performing a logical operation on the encryption key.

17. A data transfer device according to claim 16, wherein the logical operation comprises exclusive disjunction.

18. A data transfer device according to claim 16, wherein the logical operation comprises inverting the encryption key.

* * * * *